United States Patent
Csurka et al.

(10) Patent No.: US 8,111,923 B2
(45) Date of Patent: Feb. 7, 2012

(54) SYSTEM AND METHOD FOR OBJECT CLASS LOCALIZATION AND SEMANTIC CLASS BASED IMAGE SEGMENTATION

(75) Inventors: Gabriela Csurka, Crolles (FR); Florent Perronnin, Domene (FR)

(73) Assignee: Xerox Corporation, Norwalk, CT (US)

( * ) Notice: Subject to any disclaimer, the term of this patent is extended or adjusted under 35 U.S.C. 154(b) by 800 days.

(21) Appl. No.: 12/191,579

(22) Filed: Aug. 14, 2008

(65) Prior Publication Data
US 2010/0040285 A1 Feb. 18, 2010

(51) Int. Cl.
*G06K 9/46* (2006.01)
*G06K 9/00* (2006.01)
*G06K 9/64* (2006.01)
(52) U.S. Cl. .......... 382/190; 392/170
(58) Field of Classification Search .......... 382/159, 382/164, 170, 173, 190, 224, 225, 228, 254; 707/2, 3, 5, 723, 741, E17.071, E17.108; 358/1.15, 1.9; 704/245
See application file for complete search history.

(56) References Cited

U.S. PATENT DOCUMENTS

| | | | | |
|---|---|---|---|---|
| 7,289,985 B2 * | 10/2007 | Zeng et al. | | 707/749 |
| 7,742,641 B2 * | 6/2010 | Ivanov et al. | | 382/224 |
| 7,827,172 B2 * | 11/2010 | Zaragoza | | 707/723 |
| 7,949,186 B2 * | 5/2011 | Grauman et al. | | 382/170 |
| 2002/0172419 A1 | 11/2002 | Lin et al. | | |
| 2007/0005356 A1 | 1/2007 | Perronnin | | |
| 2007/0258648 A1 | 11/2007 | Perronnin | | |
| 2008/0003547 A1 | 1/2008 | Woolfe et al. | | |
| 2008/0007749 A1 | 1/2008 | Woolfe | | |
| 2008/0068641 A1 | 3/2008 | Dance et al. | | |
| 2008/0069456 A1 | 3/2008 | Perronnin | | |
| 2009/0327264 A1 * | 12/2009 | Yu et al. | | 707/5 |
| 2010/0040285 A1 * | 2/2010 | Csurka et al. | | 382/170 |
| 2010/0092085 A1 * | 4/2010 | Marchesotti | | 382/173 |
| 2010/0189354 A1 * | 7/2010 | De Campos et al. | | 382/190 |
| 2011/0004606 A1 * | 1/2011 | Aumann et al. | | 707/759 |
| 2011/0047163 A1 * | 2/2011 | Chechik et al. | | 707/741 |

OTHER PUBLICATIONS

A.Bosch, et al., Using Appearance and Context for Outdoor Scene Object Classification, *In ICIP*, 2005.
A.Levin, et al., Learning to Combine Bottom-Up to Top-Down Segmentation, *ECCV*, 2006.

(Continued)

*Primary Examiner* — Amir Alavi
(74) *Attorney, Agent, or Firm* — Fay Sharpe LLP

(57) ABSTRACT

An automated image processing system and method are provided for class-based segmentation of a digital image. The method includes extracting a plurality of patches of an input image. For each patch, at least one feature is extracted. The feature may be a high level feature which is derived from the application of a generative model to a representation of low level feature(s) of the patch. For each patch, and for at least one object class from a set of object classes, a relevance score for the patch, based on the at least one feature, is computed. For at least some or all of the pixels of the image, a relevance score for the at least one object class based on the patch scores is computed. An object class is assigned to each of the pixels based on the computed relevance score for the at least one object class, allowing the image to be segmented and the segments labeled, based on object class.

21 Claims, 11 Drawing Sheets

OTHER PUBLICATIONS

A.Yezzi, et al., A Fully Global Approach to Image Segmentation Via Coupled Curve Evolution Equations, *Journal of Visual Communication and Image Representation*, vol. 13, No. 1/2, pp. 195-216, Mar./Jun. 2002.

B.Krishnapuram, et al., Sparse Multinomial Logistic Regression: Fast Algorithms and Generalization Bounds, *IEEE PAMI*, 27(6):957-968 (2005).

B.Liebe, et al., Combined Object Categorization and Segmentation with an Implicit Shape Model, *In ECCV'04 Workshop on Statistical Learning for Computer Vision*, May 2004.

B.Russell, et al., Using Multiple Segmentations to Discover Objects and Their Extent in Image Collections, *In CVPR*, 2006.

D.Comaniciu, et al., Mean Shift: A Robust Approach Toward Feature Space Analysis, *IEEE Trans. Pattern Anal. Machine Intell.*, 24, 603-619, 2002.

U.S. Appl. No. 11/170,496, filed Jun. 30, 2005, Perronnin.
U.S. Appl. No. 11/418,949, filed May 5, 2006, Perronnin.
U.S. Appl. No. 11/767,739, filed Jun. 25, 2007, Bressan et al.
U.S. Appl. No. 12/033,434, filed Feb. 19, 2008, Csurka.
U.S. Appl. No. 12/049,520, filed Mar. 17, 2008, Marchesotti.
U.S. Appl. No. 12/123,511, filed May 20, 2008, Marchesotti.
U.S. Appl. No. 12/123,586, filed May 20, 2008, Marchesotti.
U.S. Appl. No. 12/175,857, filed Jul. 18, 2008, Marchesotti.
U.S. Appl. No. 61/056,189, filed May 27, 2008, Mestha et al.

D.Lowe, Distinctive Image Features from Scale-Invariant Keypoints, *IJCV*, 60(2):91-110 (2004).

D.Lowe, Object Recognition from Local Scale-Invariant Features, *In ICCV*, 1999.

E.Borenstein, et al., Combining Top-Down and Bottom-Up Segmentation, *In CVPR*, 2004.

F.Perronnin, et al., Adapted Vocabularies for Generic Visual Categorization, *In ECCV*, 2006.

F.Perronnin, et al., Fisher Kernels on Visual Vocabularies for Image Categorization, *In CVPR*, 2007.

G.Csurka, at al., Visual Categorization with Bags of Keypoints, *ECCV Intl. Workshop on Statistical Learning in Computer Vision*, Prague, 2004.

G.Woolfe, Natural Language Color Editing, *Annual Meeting of the Inter-Society Color Council (ISCC)*, 2007.

H.Fu., et al., Region Based Visual Object Categorization Using Segment Features and Polynomial Image Modeling, *LIRIS*, UMR 5205 CNRS, 2008.

http://www.caip.rutgers.edu/riul/research/code/EDISON/index/html (2003).

J.Shi, et al., Normalized Cuts and Image Segmentation, *PAMI*, vol. 22, No. 8, 2000.

J.Shotton, et al., Textonboost: Joint Appearance, Shape and Context Modelinq for Multi-Class Object Recognition and Segmentation, *In ECCV*, 2006.

J.Sivic, et al., Video Google: A Text Retrieval Approach to Object Matchinq in Videos, *In Proc. of the Ninth IEEE Intl. Conference on Computer Vision (ICCV)*, 2003.

J.Verbeek, et al., Region Classification with Markov Field Aspects Models, *In CVPR*, 2007.

J.Verbeek, et al., Scene Segmentation with CRFs Learned from Partially Labeled Images, *In NIPS*, 2007.

J.Winn, et al., Locus: Learning Object Classes with Unsupervised Segmentation, *In ICCV*, 2005.

J.Winn, et al., The Layout Consistent Random Field for Recognizing and Segmenting Partially Occluded Objects, *In CVPR*, 2006.

K.Mikolajczyk, et al., A Comparison of Affine Region Detectors, *Intl. J. Computer Vision*, vol. 65, No. 1/2 (2005).

K.Mikolajczyk, et al., A Performance Evaluation of Local Descriptors, *IEEE Transactions on Pattern Analysis & Machine Intelligence*, vol. 27, No. 10 (2005).

K.Mikolajczyk, et al., An Affine Invariant Interest Point Detector, *In ECCV*, 2002.

L.Cao, et al., Spatially Coherent Latent Topic Model for Concurrent Segmentation and Classification of Objects and Scenes, *In ICCV*, 2007.

L.Yang, et al., Multiple Class Segmentation Using a Unified Framework Over Mean-Shift Patches, *In CVPR*, 2007.

M.P.Kumar, et al., Obj Cut, *In CVPAR*, 2005.

M.Rousson, et al., Prior Knowledge, Level Set Representations & Visual Grouping, *Intl. Journal of Computer Vision*, vol. 76, No. 3, pp. 231-243, Mar. 21, 2008.

N.Xu, et al., Object Segmentation Using Graph Cuts Based Active Contours, *In IEEE Computer Society Conference on Computer Vision and Pattern Recognition*, 2003.

S.Kumar, et al., A Hierarchical Field Framework for Unified Context-Based Classification, *In ICCV*, 2005.

T.S.Jaakkola, et al., Exploiting Generative Models in Discriminative Classifiers, *Proceedings of the 1998 Conference on Advances in Neural Information Processing Systems II*, pp. 487-493, 1999.

X.He, et al., Multiscale Conditional Random Fields for Image Labeling, *In CVPR*, 2004.

Y.Boykov, et al., Computing Geodesics and Minimal Surfaces Via Graph Cuts, *In IEEE Intl. Conference on Computer Vision (ICCV)*, pp. 26-33, Oct. 2003.

Z.Tu, et al., Image Parsing: Unifying Segmentation, Detection, and Recognition, *IJCV*, Marr Prize Issue, 2005.

D.Larlus, et al., Category Level Object Segmentation—Learning to Segment Objects with Latent Aspect Models, *VISAPP*, (2), 2007.

* cited by examiner

SYSTEM AND METHOD FOR OBJECT CLASS LOCALIZATION AND SEMANTIC CLASS BASED IMAGE SEGMENTATION

CROSS REFERENCE TO RELATED PATENTS AND APPLICATIONS

The following copending applications, the disclosures of which are incorporated herein in their entireties by reference, are mentioned:

U.S. application Ser. No. 11/767,739, filed Jun. 25, 2007, entitled CLASS-BASED IMAGE ENHANCEMENT SYSTEM, by Marco Bressan, et al.

U.S. application Ser. No. 12/033,434, filed on Feb. 19, 2008, entitled CONTEXT DEPENDENT INTELLIGENT THUMBNAIL IMAGES, by Gabriela Csurka.

U.S. application Ser. No. 12/123,586, filed on May 20, 2008, entitled METHOD FOR AUTOMATIC ENHANCEMENT OF IMAGES CONTAINING SNOW, by Luca Marchesotti.

U.S. application Ser. No. 12/049,520, filed Mar. 17, 2008, entitled AUTOMATIC GENERATION OF A PHOTO GUIDE, by Luca Marchesotti.

U.S. application Ser. No. 12/123,511, filed on May 20, 2008, entitled IMPROVING IMAGE VISUALIZATION THROUGH CONTENT-BASED INSETS, by Luca Marchesotti.

U.S. application Ser. No. 12/175,857, filed Jul. 18, 2008, entitled SYSTEM AND METHOD FOR AUTOMATIC ENHANCEMENT OF SEASCAPE IMAGES, by Luca Marchesotti.

U.S. Provisional Application Ser. No. 61/056,189, filed May 27, 2008, entitled IMAGE INDEXED RENDERING OF IMAGES FOR TUNING IMAGES FROM MULTIPLE PRINT ENGINES, by Lalit K. Mestha, et al.

BACKGROUND

The exemplary embodiment relates to semantic classification of images. It finds particular application in connection with the assignment of object classes to pixels or regions of an image, and will be described with particular reference thereto.

Automated techniques have been developed for image classification. These techniques rely on classifiers which have generally been trained on a set of manually labeled training images. A new image can then be labeled as having a probability that it contains a certain type of object, such as sky, a person, a face, a car, a flower, an animal, a building, or the like. The labels can be used for determining appropriate further processing of the image, such as suitable image enhancements in an automated image processing system. Alternatively, the labels can be used for archiving images or in retrieval systems, for example, to provide responsive images to a user's search query, such as a search for pictures of people.

In general, such image classification techniques do not attempt to locate the objects within an image. Such information would be useful, for example, for a variety of applications, such as image cropping, content based local image enhancement or rendering, insertion techniques which involve selecting a part of one image to be incorporated into the same or another image, and the like. Currently, localization of objects in images relies on grouping pixels into homogeneous regions, based on low level information, such as the color of pixels or texture. Thus, for example, 'sky' may be inferred to be localized in a patch of uniform blue pixels. For many objects, however, such localization techniques tend to be unreliable.

Other approaches have been attempted for recognition and localization of objects. For example, in the method of Liebe, et al., image patches are extracted and matched to a set of codewords learned during a training phase (B. Leibe, A. Leonardis, and B. Schiele, 'Combined object categorization and segmentation with an implicit shape model,' in *ECCV Workshop on Statistical Learning for Computer Vision*, 2004). Each activated codeword then votes for possible positions of the object center. Others have proposed to combine low-level segmentation with high-level representations. Borenstein, et al., for example, computes a pixel probability map using a fragment-based approach and a multi-scale segmentation (E. Borenstein, E. Sharon, and S. Ullman, "Combining top-down and bottom-up segmentation," in *CVPR*, 2004). The pixel labeling takes into account the fact that pixels within homogeneous regions are likely to be segmented together. Russell, et al. and Yang, et al. perform respectively normalized cuts and mean-shift segmentation and compute bags-of-keypoints at the region level (B. Russell, A. Efros, J. Sivic, W. Freeman, and A. Zisserman, 'Using multiple segmentations to discover objects and their extent in image collections,' in *CVPR*, 2006; L. Yang, P. Meer, and D. J. Foran, 'Multiple class segmentation using a unified framework over mean-shift patches, in *CVPR*, 2007). Cao, et al. uses Latent Dirichlet Allocation (LDA) at the region level to perform segmentation and classification and force the pixels within a homogeneous region to share the same latent topic (L. Cao and L. Fei-Fei, 'Spatially coherent latent topic model for concurrent segmentation and classification of objects and scenes,' in *ICCV*, 2007). Others rely on low-level cues to improve the semantic segmentation without the need to perform explicit low-level segmentation. The different cues are generally incorporated in a random field model, such as a Markov random field (MRF). As local interactions are insufficient to generate satisfying results, global supervision is incorporated in the MRF. In the LOCUS algorithm, described by Winn, et al., this takes the form of prototypical class mask which can undergo deformation (J. Winn and N. Jojic, 'Locus: Learning object classes with unsupervised segmentation,' in *ICCV*, 2005). In other methods, it takes the form of a latent model (see J. Verbeek and B. Triggs, 'Region classification with Markov field aspects models,' in *CVPR*, 2007; and M. Pawan Kumar, P. H. S. Torr, and A. Zisserman, 'Obj cut,' in *CVPR*, 2005).

While the MRF is generative in nature, the conditional random field (CRF) models directly the conditional probability of labels given images. He, et al., incorporates region and global label features to model shape and context (X. He, R. Zemel, and M. Á. Carreira-Perpiñán, 'Multiscale conditional random fields for image labeling,' in *CVPR*, 2004). Kumar, et al. proposes a two-layer hierarchical CRF which encodes both short- and long-range interactions (S. Kumar and M. Hebert, 'A hierarchical field framework for unified context-based classification,' in *ICCV*, 2005). Textonboost is a discriminative model which is able to merge appearance, shape and context information (J. Shotton, J. Winn, C. Rother, and A. Criminisi, 'Textonboost: Joint appearance, shape and context modeling for multi-class object recognition and segmentation,' in *ECCV*, 2006). Winn, et al. proposes the layout consistent random field, an enhanced version of the CRF which can deal explicitly with partial occlusion (J. Winn and J. Shotton, 'The layout consistent random field for recognizing and segmenting partially occluded objects,' in *CVPR*, 2006). Verbeek, et al. addresses the case of partially labeled images (J. Verbeek and B. Triggs, 'Scene segmentation with crfs learned from partially labeled images,' in *NIPS,* 2007).

There remains a need for improved methods for semantic segmentation of an image which allows different segments of an image to be labeled according to respective object classes.

INCORPORATION BY REFERENCE

The following references, the disclosures of which are incorporated by reference herein in their entireties, are mentioned:

U.S. Pub. No. 2007/0005356, published Jan. 4, 2007, entitled GENERIC VISUAL CATEGORIZATION METHOD AND SYSTEM, by Florent Perronnin, discloses techniques for classifying images based on class visual vocabularies constructed by merging a general visual vocabulary with class-specific visual vocabularies.

U.S. Pub. No. 2007/0258648, published Nov. 8, 2007, entitled GENERIC VISUAL CLASSIFICATION WITH GRADIENT COMPONENTS-BASED DIMENSIONALITY ENHANCEMENT, by Florent Perronnin, discloses an image classification system with a plurality of generative models which correspond to a plurality of image classes. An image classifier classifies the image respective to the plurality of image classes based on the gradient-based vector representations of class similarity.

U.S. Pub. No. 2008/0069456, published Mar. 20, 2008, entitled BAGS OF VISUAL CONTEXT-DEPENDENT WORDS FOR GENERIC VISUAL CATEGORIZATION, by Florent Perronnin, discloses an image classification method which includes generating category context models for image categories which include sums of soft co-occurrences of pairs of visual words in geometric proximity to each other in training images assigned to the category. An image category can be assigned to a new image to be classified based on closeness of context information about the image to the category context models.

U.S. Pub. No. 2008/0007749, published Jan. 10, 2008, entitled NATURAL LANGUAGE COLOR COMMUNICATION AND SYSTEM INTERFACE, by Geoffrey J. Woolfe and U.S. Pub. No. 2008/0003547, published Jan. 3, 2008, entitled NATURAL LANGUAGE COLOR SELECTOR AND NAVIGATOR FOR SELECTING COLORS FROM A COLOR SET, by Geoffrey J. Woolfe, et al. relate to a natural language color control system and method. The system of 2008/0003547 includes a dictionary of ordinary language color terms, a working color space, wherein every portion of the working color space is mapped to at least one term in the color term dictionary, and an ordinary language command lexicon and syntax for use with the ordinary language color terms that correspond to transformations in the working color space. The dictionary of color terms may be created or chosen from pre-existing dictionaries.

Csurka, et al., "Visual Categorization with Bags of Keypoints," ECCV International Workshop on Statistical Learning in Computer Vision, Prague, 2004, discloses a method for generic visual categorization based on vector quantization.

U.S. Pub. No. 2002/0172419, entitled IMAGE ENHANCEMENT USING FACE DETECTION, by Lin, et al., discloses using face detection algorithms for automatically detecting human faces in an image and automatically enhancing an appearance of the image based on the human faces in the image.

U.S. Pub. No. 2008/0068641, published Mar. 20, 2008, entitled DOCUMENT PROCESSING SYSTEM, by Christopher R. Dance, et al., discloses an image characterization method for identifying images, such as personal photographs, which are to be assigned a different printing protocol from other images.

BRIEF DESCRIPTION

In accordance with one aspect of the exemplary embodiment, an automated image processing method includes extracting a plurality of patches of an input image. For each patch, at least one high level feature is extracted based on its low level representation and a generative model built from low level features. For each patch, and for at least one object class from a set of object classes, a relevance score is computed for the patch based on the at least one high level feature and the output of a patch classifier. For at least some of the pixels of the image, a relevance score for the at least one object class is computed, based on the patch scores. An object class label is assigned to each of the pixels based on the computed relevance score for the at least one object class.

In accordance with another aspect of the exemplary embodiment, an automated image processing system includes a patch extractor which extracts patches of an input image. A low level feature extractor extracts, for each patch, a low level feature. A high level feature extractor extracts, for each patch, a high level feature based on the low level feature. A classifier system is configured for classifying the patch based on the high level feature for each of a set of object classes. For each patch, and for at least one object class from a set of object classes, a scoring component computes a relevance score for the patch based on the at least one high level feature. For at least some of the pixels of the image, the scoring component computes a relevance score for the at least one object class based on the patch scores. A labeling component assigns an object class to each of the pixels based on the computed relevance score for at least one object class.

In accordance with another aspect of the exemplary embodiment, a digital image processing method includes, for an input image, extracting patches in the image. From each patch, a low-level representation comprising a feature vector is extracted. For each patch, its low-level representation and a generative model are used to extract a high-level representation. For each patch and each class, a relevance score is computed, based on the high-level representation and a classifier. For each pixel and each class, a relevance score is computed based on the patch scores. For each pixel, a decision is taken, based on the class relevance scores.

DETAILED DESCRIPTION

Figure 1:
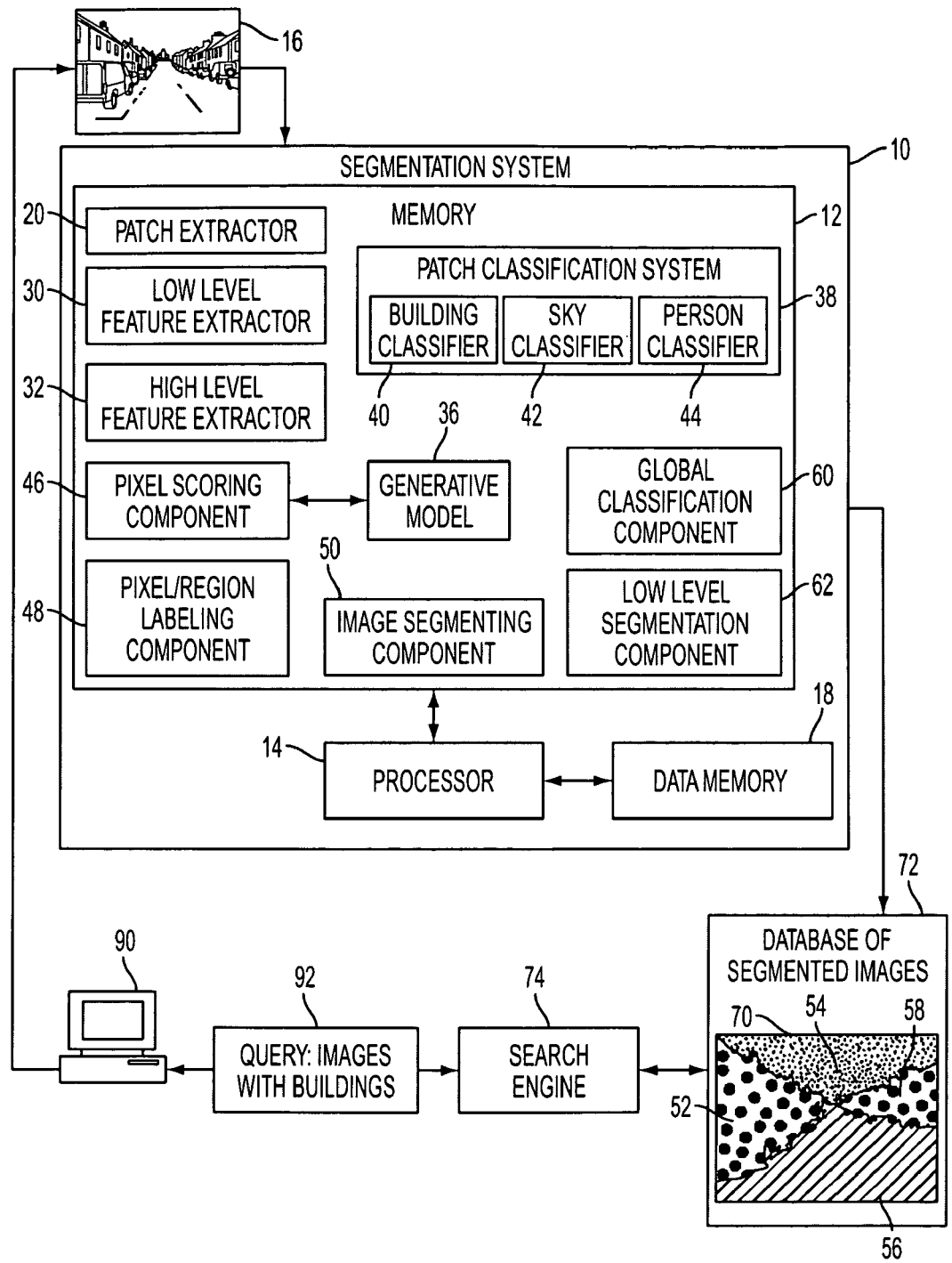
FIG. 1 is a functional block diagram of an exemplary image segmentation system.

Aspects of the exemplary embodiment relate to a method, a system, and a computer program product for automated semantic class-based image segmentation. The exemplary system and method allow the assignment of class labels to every pixel in an image.

By 'class-based segmentation' it is meant the automated partitioning of a digital image into a plurality of segments, is based on an object class assigned to pixels in the segment. The class-based segmentation may result in the labeling of the image data itself or the labeling may be stored separately from the image, e.g., as a pixel map.

One advantage of the exemplary semantic class-based image segmentation system is that it is able to partition an image into semantically meaningful regions. This is in contrast to the classical image segmentation approach, which is aimed at partitioning an image into regions which are homogeneous with respect to low-level features such as color, texture, etc. This distinction can be understood as the difference between clustering (low level segmentation) and classification (in the present case).

As will be appreciated, there is not one unique way to segment an image into semantic regions. For example, for some applications it may be useful to segment/label a region containing a person, with the rest of the image labeled as 'background' or 'other'. For other applications, it may be more useful to segment sub-parts of a person, such as the head, the body, the legs, or the like. Accordingly, in constructing the exemplary class-based image segmentation system, a set of predefined semantic class labels are defined, which are appropriate to the classes of interest (and optionally an additional "other" class for labeling all other segments which do not fall into one of the other classes). In the exemplary embodiment, a classifier system incorporates one or more binary classifiers, one for each of the predefined classes. Each classifier is trained to assign probabilities to the pixels of an image of being in a given class. Based on the probabilities, an overall class label is assigned to the pixel. It is to be appreciated, however, that in place of binary classifiers, multi-class classifiers may alternatively be used.

In one embodiment, a class probability map is determined for each class. The class probability map is a map containing for each pixel, the estimated probability that the pixel belongs to the given class, (e.g. car, sky, person, etc). These maps are then combined to obtain an overall labeling of the image pixels.

In the exemplary embodiment, each semantic class is considered independently in the sense that binary classifiers are trained considering the class versus non-class. Therefore, if N semantic classes are considered, N class probability maps are built where each map is related to a single class. There are several methods that can be used to build such maps, as outlined in greater detail below.

The automated class-based segmentation system method may find application in some or all of the following:

Class based image enhancement, as disclosed, for example, in above-mentioned U.S. application Ser. Nos. 12/123,586 and 12/175,857;

Natural Language Interfaces (Color Management), as disclosed, for example, in Geoffrey Woolfe, Natural Language Color Editing, Annual Meeting of the Inter-Society Color Council (ISCC), 2007, and above-mentioned U.S. Pub. Nos. 2008/0007749 and 2008/0003547;

Intelligent auto-cropping and thumbnailing, as disclosed, for example in above-mentioned U.S. application Ser. No. 12/033,434;

Image retrieval and image asset management for users' photographic and document images; and Image indexed rendering of images for tuning images from one or multiple print engines, as disclosed, for example, in U.S. Provisional Application Ser. No. 61/056,189.

With reference to FIG. 1, an exemplary class-based image segmentation system 10 is illustrated. The segmentation system 10 may be hosted by one or more dedicated computer systems, such as a server linked to a web-based image processing system, or by a general purpose computer, such as a desktop, laptop, or the like. The system 10 may be embodied in software, hardware, or both. In the exemplary embodiment, the system 10 comprises software instructions stored in memory 12, which are executed by a processor 14, such as a CPU, in communication with memory 12. For convenience, the system 10 is described in terms of a set of software components, although it will be appreciated that some components may be combined or split into subcomponents.

The system 10 receives, as input, a digital image 16, such as a photograph, to be processed and segmented. During processing, the image 16 may be stored in data memory 18, which is accessible to the processor 14. Memory 18 can be incorporated into memory 12 or may be separate therefrom.

Figure 2:
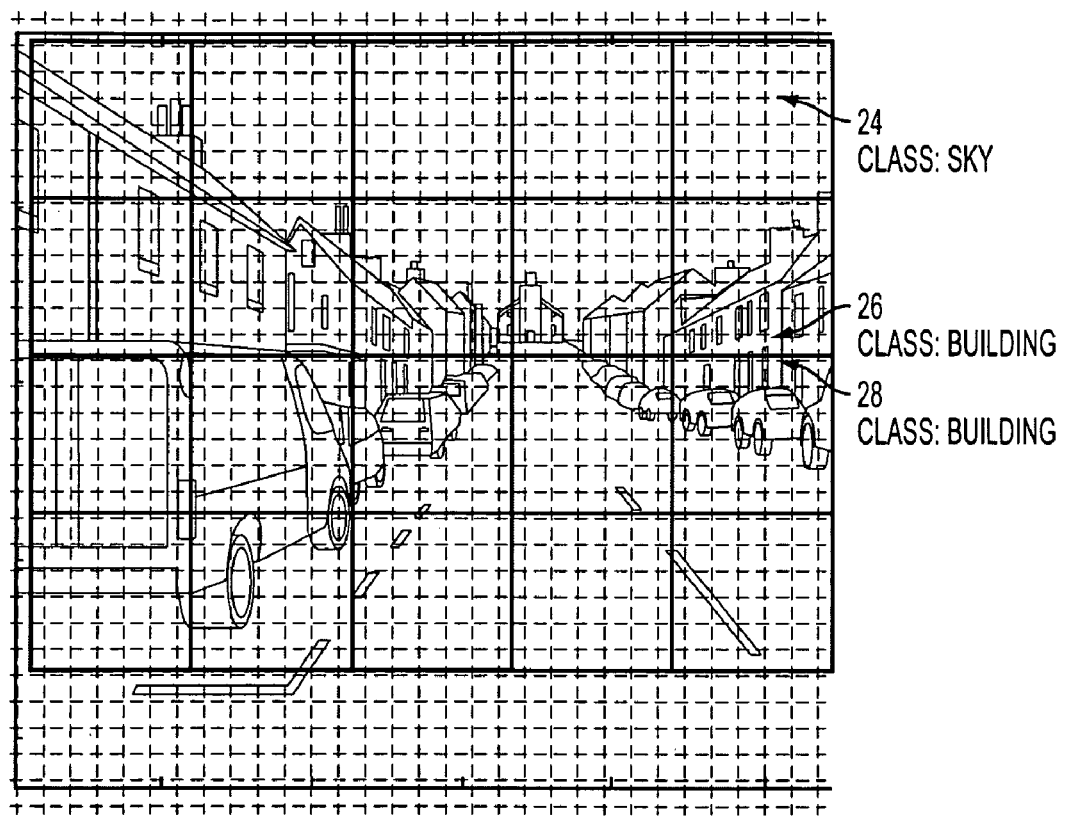
FIG. 2 illustrates an exemplary image showing patches extracted on a grid and object classes assigned to exemplary patches of the image.

The components of the system 10 will be best understood with reference to the exemplary method and will be described only briefly here. In particular, the system 10 includes a patch extractor 20, which extracts patches 24, 26, 28, etc. (FIG. 2) of the input image 16. The system 10 includes one or more feature extractors for extracting features from the patch. In the exemplary embodiment, the feature extractors include a low level feature extractor 30, which extracts a low level feature from each patch which is representative thereof, e.g., derived from the image data, and a high level feature extractor 32, which, through use of a generative model 36, extracts high level features from the patch. The system 10 further includes a patch classification system 38, comprising a set of patch classifiers, such as binary classifiers 40, 42, 44, etc., one for each of a set of object classes, here illustrated as a building classifier 40, a sky classifier 42, and a person classifier 44, as examples, which provide probability-based scores for each patch and for each class, based on the extracted features, which in the exemplary embodiment, are the high level features. As will be appreciated, there may be fewer or more than three binary classifiers, e.g., at least one and generally from 2-50, although more patch classifiers can be provided if sufficient training data is available. A pixel scoring component 46 scores the pixels in the image, based on the patch scores. A pixel/region labeling component 48 labels pixels/regions of pixels, based on the scores output by the scoring component 46. An image segmenting component 50 may segment the image into class-based segments 52, 54, 56, 58, etc. based on the pixel labels.

The system 10 may further include a global semantic classification component 60 (generally a set of binary classifiers, as for the patch classifiers), which is trained to classify the entire image 16, rather than individual pixels. The output of the global classifier 60 (one or more most probable classes for the entire image) is used to identify, from the set of binary classifiers 40, 42, 44, etc., a subset of the binary classifiers which are then used by the patch classification system 38.

Additionally, the system 10 may include a low level segmentation component 62, which segments the image into regions of contiguous pixels based not on object class but on homogeneity of color or texture of pixels.

The output of the system 10 is a labeled image 70 in which segments 52, 54, 56, 58 are labeled according to object class (here illustrated by different shading). The labeled image 70 may be stored in a database 72, which is indexed according to the labels. The database 72 may be queried via a search engine 74 to identify responsive images indexed by a label corresponding to the query, and specifically, to retrieve responsive segments. Alternatively, the labeled image 70 is processed by another processing component, such as one or more of:

a. a cropping component (not shown), which selects a portion of the image 16 to be cropped, based on the labeled image 70, b. an image enhancement component, which improves the quality of the selected region according to its content;

c. an image rendering component that selects the corresponding color profile for the region based on its content.

Figure 3:
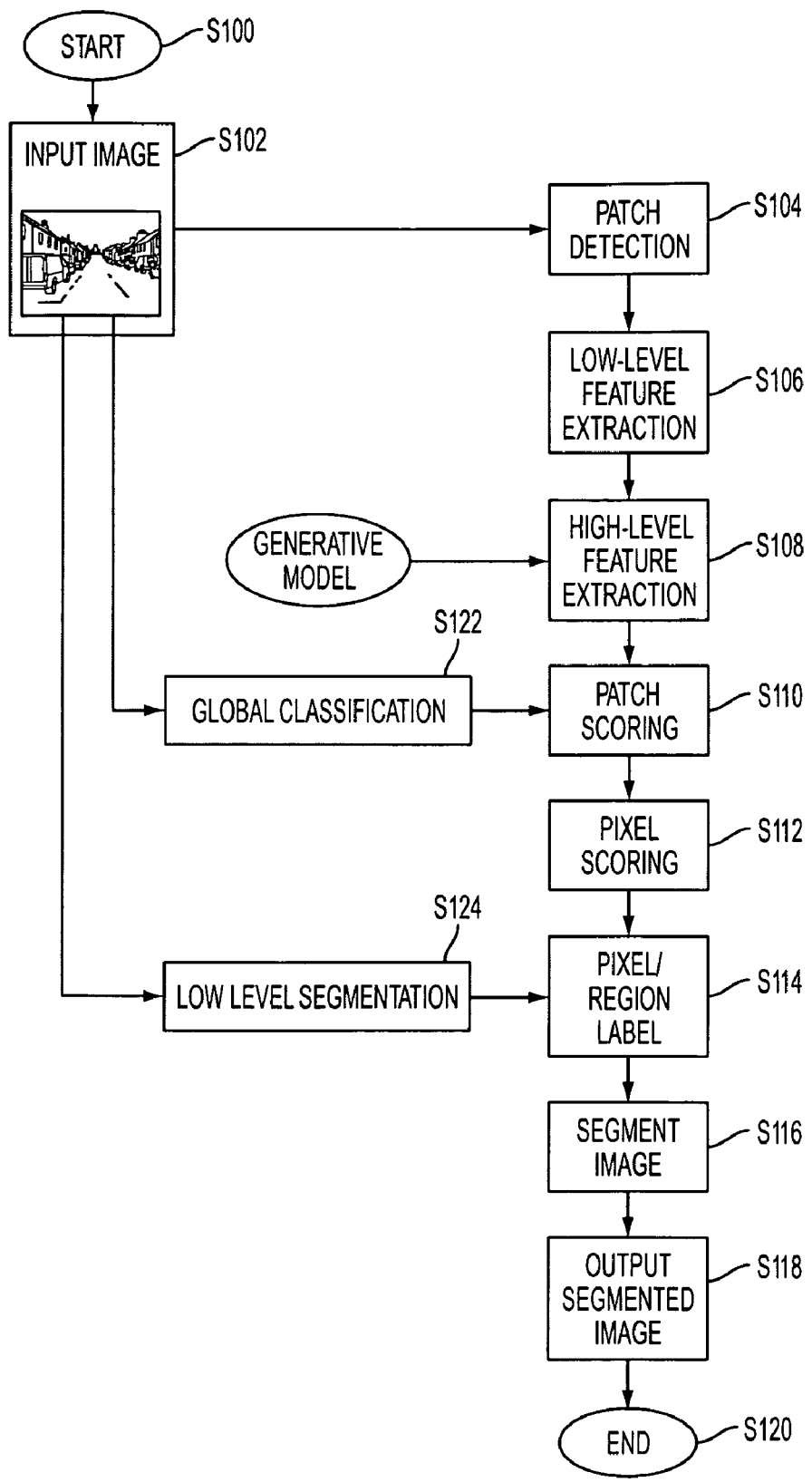
FIG. 3 is a flowchart which illustrates steps of an exemplary image segmentation process.
Figure 4A:
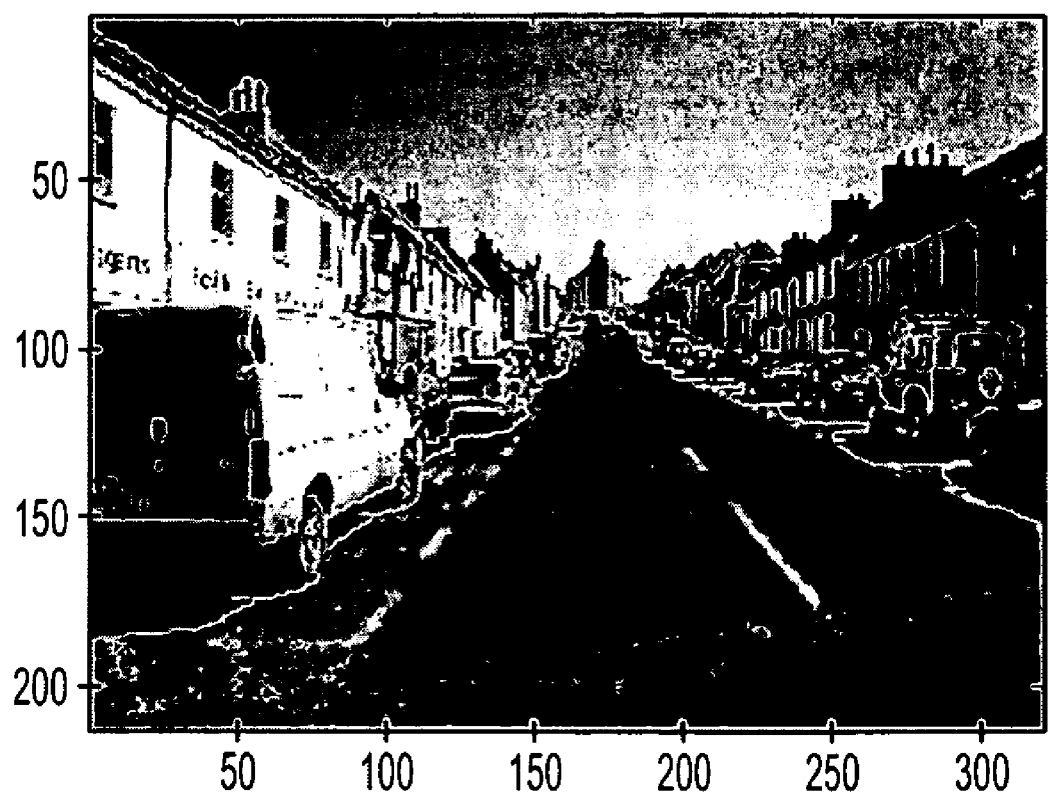
FIG. 4 illustrates the results of segmenting an original image (FIG. 4A): manually (FIG. 4B), using pixel labeling (FIG. 4C), and using region labeling (FIG. 4D)
Figure 4B:
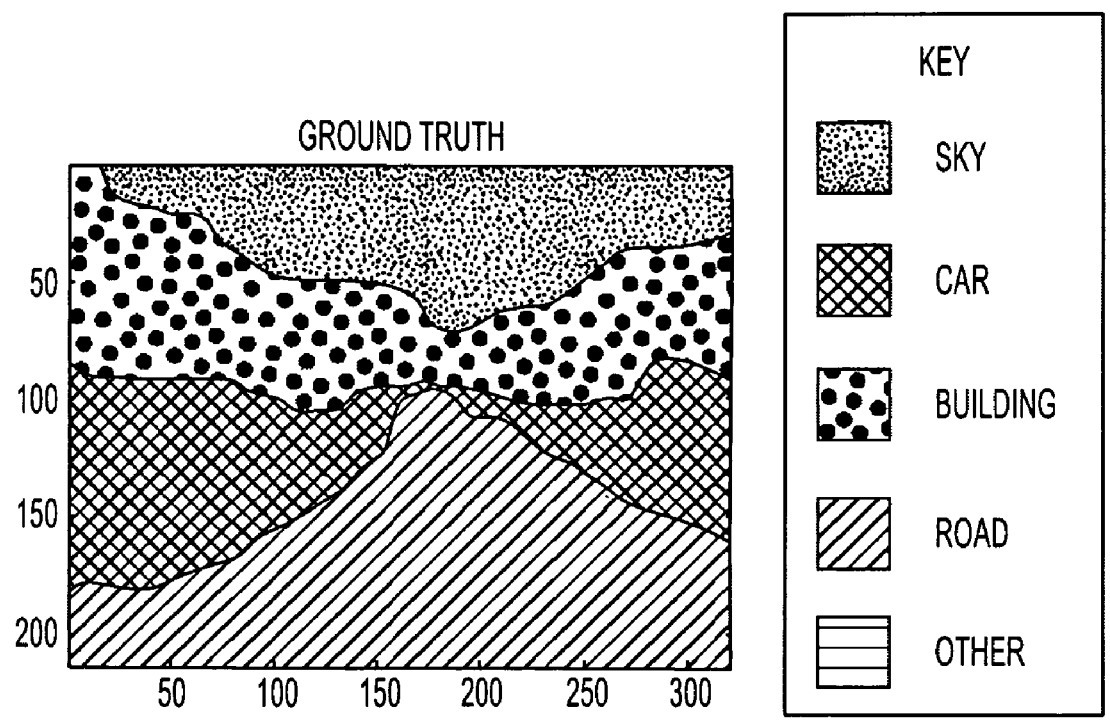
Figure 4C:
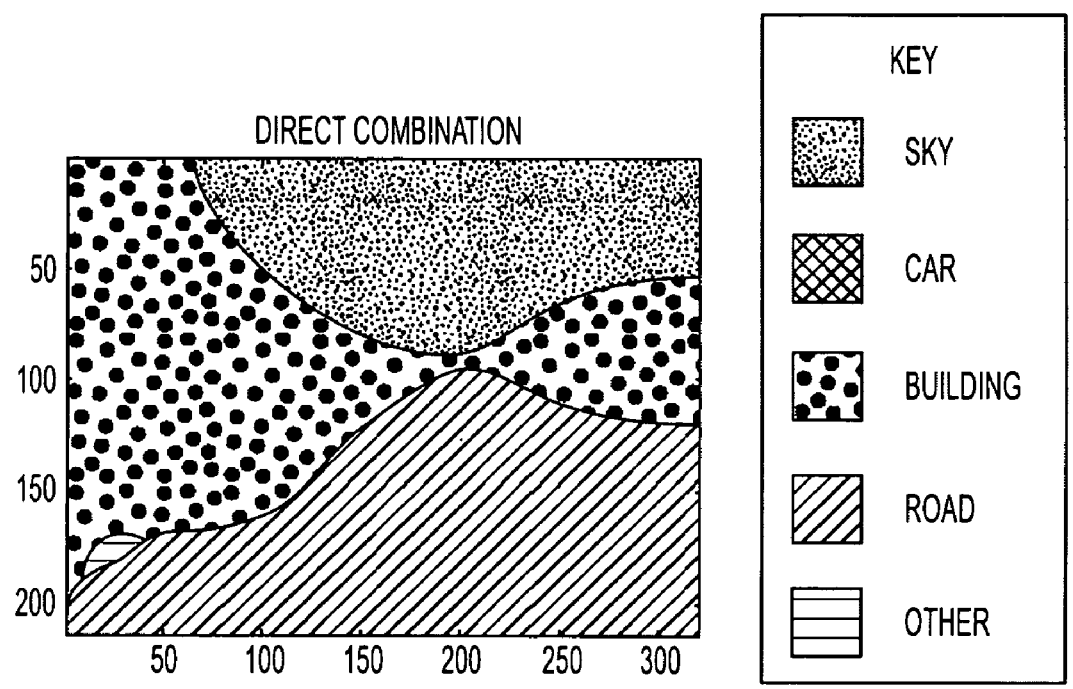
Figure 4D:
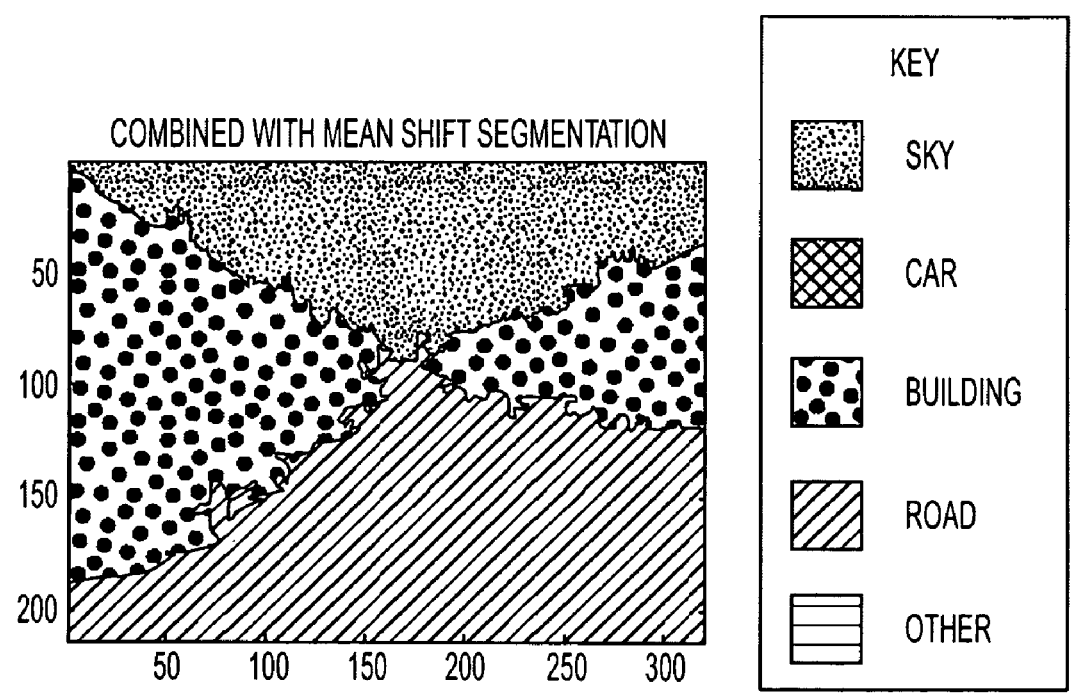
Figure 5A:
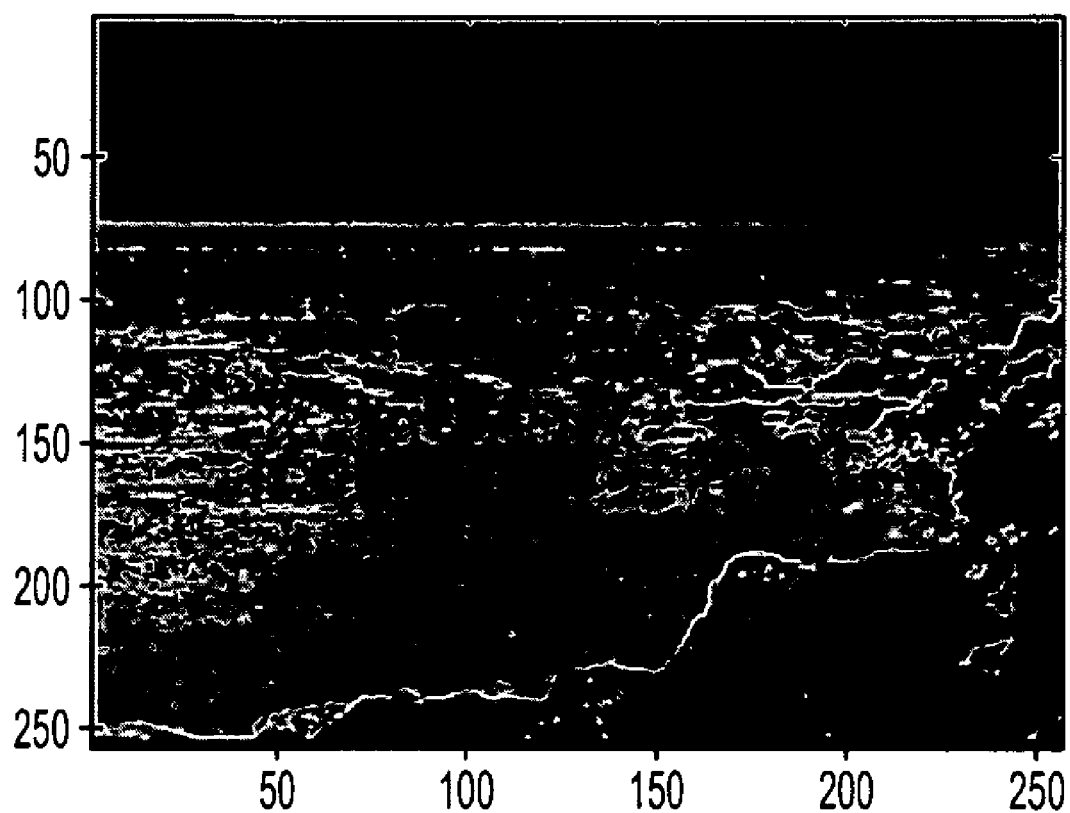
FIG. 5 illustrates the results of segmenting another original image (FIG. 5A): manually (FIG. 5B), using pixel labeling (FIG. 5C), and using region labeling (FIG. 5D).
Figure 5B:
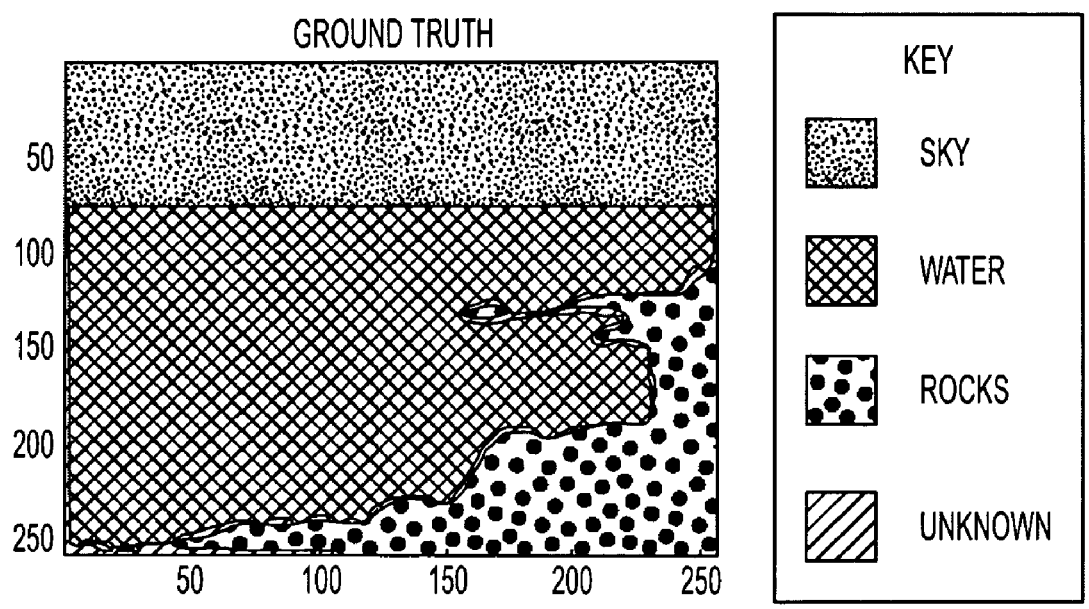
Figure 5C:
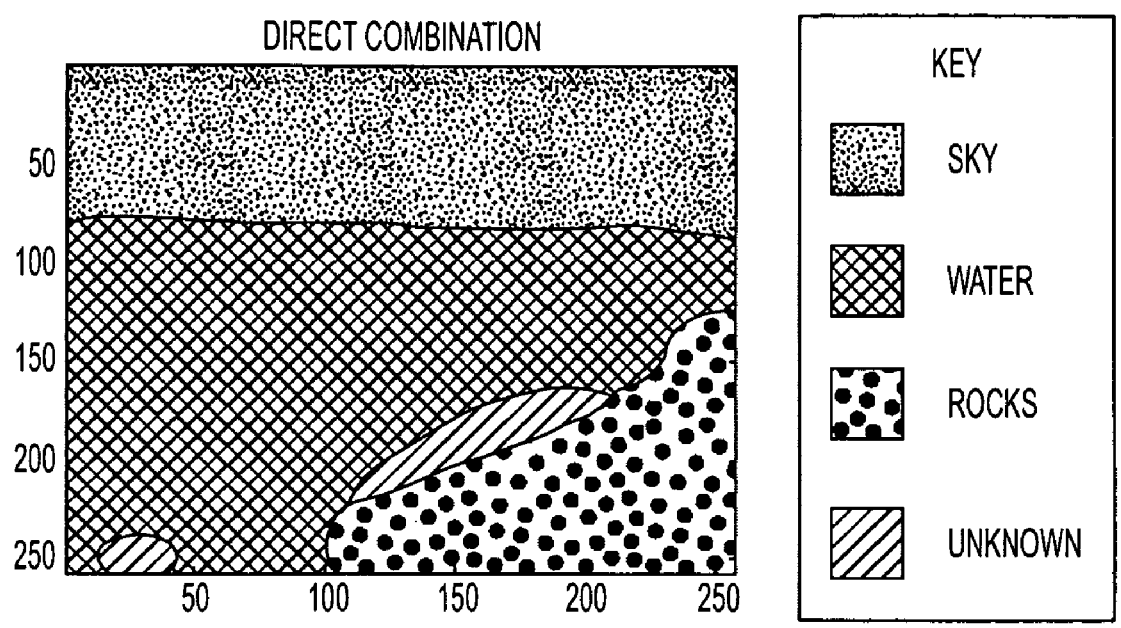
Figure 5D:
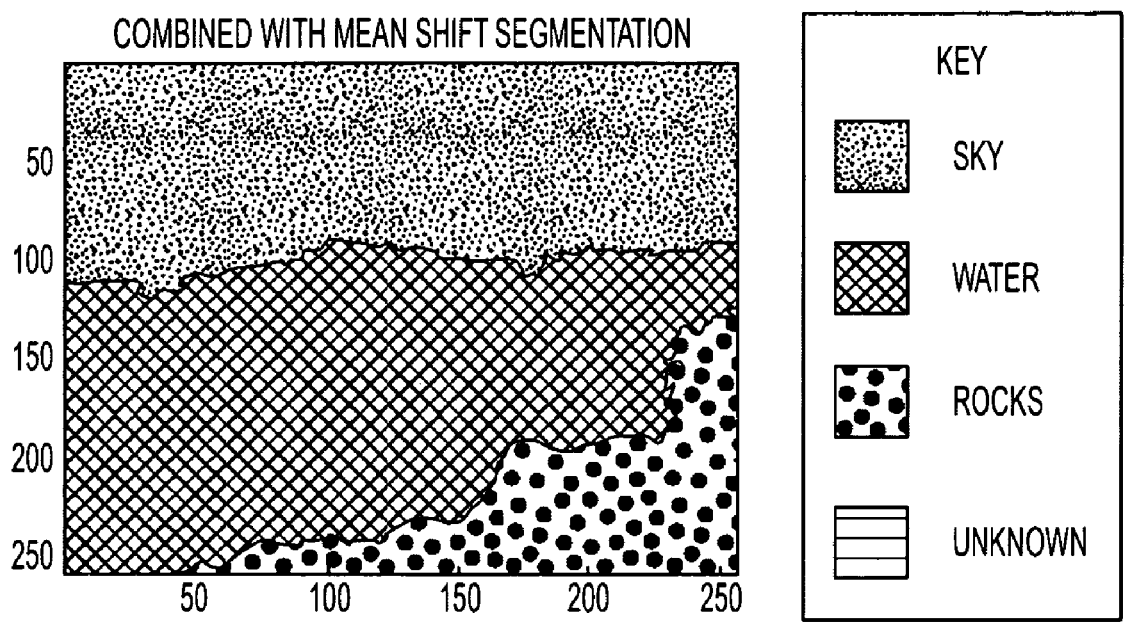

With reference to FIG. 3, an exemplary computer-implemented image processing method is illustrated which may be performed with the system of FIG. 1. The method presumes the existence of trained binary classifiers 40, 42, 44, etc, one for each of a set of object classes (such as person, buildings, grass, tree, cow, sheep, sky, airplane, water, face, car, bicycle, flower, sign, bird, book, chair, road, cat, dog, body, and boat, etc). A description of the training of the classifiers is provided later. The method begins at S100.

At S102, an image 16 to be processed is received and stored in data memory 18.

At S104, patches 24, 26, 28, etch, are extracted from the image 16.

Features are then extracted from each of the patches. In the exemplary embodiment, at S104, a low-level feature (or "descriptor") is extracted from each patch. In one embodiment, two or more different types of features are extracted for each patch, with each type of feature being treated separately in subsequent steps S106 and S108.

At S106, for each patch, given its low-level feature and the generative model 36, a high-level feature is computed. Exemplary high level features may be, for example, gradient vectors or bag-of-words representations.

At S108, the relevance of each patch with respect to each class is scored using the high-level patch representations and binary classifiers 40, 42, 44, etc. In other embodiments, step S106 may be omitted and the patch may be classified with the classifiers based on the low level features.

At S110, each pixel is scored with respect to each class using the patch scores. This yields one probability map for each class in which each pixel is assigned a probability score of being in that class. Where more than one type of feature is extracted for each patch, the scores for the two (or more) feature types may be combined at this stage (e.g., averaged), to yield a single map for each class.

At S112, a decision is taken for each pixel, based on the relevance score with respect to each class. For example, the class with the highest score is assigned to the pixel, provided it meets at least a predetermined threshold θ, otherwise, the 'other' class is assigned.

At S114, pixels, or regions of pixels, are labeled, based on the class decision.

At S116, the image may be segmented into segments, based on the classes assigned to the pixels.

At S118, the segmented image 70 may be output, e.g., to a database which stores the images together with the segmentation information, or further processed.

The method ends at S120.

The method may optionally include additional steps.

For example, a global classification step (S122) is optionally performed. This step involves classification of the entire input image. For example, in the global classification step, an image may be classed as both "building" and "sky" based on the outputs of "sky" and "building" classifiers, but without any localization of these objects in the image. Any object classes found not likely to be present in the image 16 during this step can be eliminated as candidate object classes for the patch scoring step (S110).

A low level segmentation step may additionally or alternatively be performed (S124). In this step, the input image 16 is segmented into fairly homogeneous regions of contiguous pixels based on similar properties of the pixels, such as color. These regions of the image are used in the pixel labeling step (S114) where each pixel in a region is accorded the same class label, based on the scores of the pixels which make up the region, e.g., based on average scores.

The method illustrated in FIG. 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 3, can be used to implement the method for class-based segmentation of an image.

Further details of the method and system will now be described in greater detail.

Image Input (S102)

The image 16 can be input from any suitable image source 90, such as a workstation, database, memory storage device, such as a disk, or the like. Typically, each input digital image 16 includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single image data channel, however expressed (e.g., L*a*b*, RGB, YCbCr, etc.). The images may be photographs, video images, combined images which include photographs along with text, and/or graphics, or the like. The images may be received in JPEG, GIF, JBIG, BMP, TIFF or other common file format used for images and which may optionally be converted to another suitable format prior to processing. Input images may be stored in data memory during processing.

For images having a large amount of image data, the resolution of the image may optionally be reduced, prior to or during processing, to reduce computation time.

Patch Extraction (S104)

In general, the patches extracted each include a portion of the image and together encompass the entire image (or at least a majority thereof) and may be overlapping. In one embodiment, the patches are extracted on a regular grid, optionally at multiple scales. The patches may be of any suitable size and shape, such as rectangles, circles, or the like. For example, the image is subdivided into rectangles of a first size to form a first set of patches. The image may be subdivided again into rectangles of a second size, smaller or larger than the first size, to generate a second set of patches, which process may be repeated one or more times. In this way, all or most of the pixels of the image are included in more than one patch. For example, at least 20 patches are extracted. In the exemplary embodiment, at least about 100 patches are extracted from the image, such as at least 500. The number of patches can be up to 1000 or 2000.

In another embodiment, the patch extractor 20 is a Harris affine detector (as described by Mikolajczyk and Schmid, in "An Affine Invariant Interest Point Detector", ECCV, 2002, and "A Performance Evaluation of Local Descriptors", in IEEE Conference on Computer vision and Pattern Recognition, June 2003). Other patch detection methods may be employed, as described, for example, in K. Mikolajczyk, et al., "A comparison of affine region detectors," *Int'l. J. Computer Vision*, Vol. 65, No. 1/2 (2005), and in above-mentioned U.S. Pub. Nos. 2007/0005356, 2007/0258648, and 2008/0069456, which are incorporated herein by reference in their entirety.

Low Level feature Extraction (S106)

For each patch, one or more types of feature is extracted, which is representative of the patch. Exemplary features which can be used include, for example, gradient histograms, vectors, and the like.

For example, Scale Invariant Feature Transform (SIFT) descriptors (as described by Lowe, in "Object Recognition From Local Scale-invariant Features", ICCV (International Conference on Computer Vision), 1999) are computed on the patches extracted by the patch extractor (e.g., normalized Harris affine regions or patches extracted on a grid). SIFT descriptors are multi-image representations of an image neighborhood. More specifically, SIFT descriptors are generally Gaussian derivatives computed at eight orientation planes over a four-by-four grid of spatial locations, giving a 128-dimensional vector. The dimensionality of the vectors may be reduced, for example, using principal component analysis (PCA), to about 50 dimensions without significant loss of information.

Other features may be used, as described, for example, in K. Mikolajczyk, "A performance evaluation of local descriptors," IEEE Transactions on Pattern Analysis & Machine Intelligence, Vol. 27, No. 10 (2005). Above mentioned U.S. Pub Nos. 2007/0005356, 2007/0258648, and 2008/0069456 also provide descriptions of feature extraction methods.

High-Level Feature Extraction (S108)

In this step, for each patch, a high-level representation is derived, based on the generative model 36. The generative model is intended to describe the generation process of the patches in the image. There are several choices of (i) generative models and (ii) of high-level features to extract from the generative model.

The generative model 36 can be a Gaussian mixture model (GMM). The model is trained offline on a large set of low-level features. It can be trained in an unsupervised manner or in a supervised manner. A single generative model 36 can be generated for all classes, as disclosed in F Perronnin and C. Dance, *Fisher Kernels on Visual Vocabularies for Image Categorization*, CVPR 2007, and U.S. Pub. No. 2007/0258648 (collectively referred to herein as Perronnin 2007). Alternatively, a different generative model can be created for each class, as disclosed in U.S. Pub. No. 2007/0005356 and F. Perronnin, C. Dance, G. Csurka and M. Bressan, *Adapted vocabularies for generic visual categorization*, ECCV 2006 (collectively referred to Perronnin 2006). Thus, in the exemplary embodiment, there may be a generative model for the class "person", another for "buildings", etc. As an alternative to GMMs, the generative model may be based on Hidden Markov Models, or a combination of GMMs and HMMs.

In one embodiment, the high level representation is a bag-of-words representation, as disclosed in Perronnin 2006. This approach is based on an intermediate representation, the visual vocabulary. In this embodiment, given the low-level feature vector and a generative model 36, a bag-of-words representation is extracted for each patch. In the case of a generative approach, the visual vocabulary is a probability density function (pdf) denoted p which models the emission of the low-level descriptors in the image. The visual vocabulary can be modeled with a Gaussian mixture model (GMM) where each Gaussian corresponds to a visual word. For example, let x denote the low-level feature vector extracted from a patch. Assume that the generative model has N Gaussians, one for each object class. Let $\gamma_i(x)$ denote the probability that x is assigned to Gaussian i. Then, in the bag-of-words representation, the high-level feature is the N-dimensional vector $[\gamma_1(x) \ldots \gamma_N(x)]$.

Let $\lambda$ be the set of parameters of p. $\lambda=\{w_i,\mu_i,\Sigma_i, i=1\ldots N\}$ where $w_i$, $\mu_i$ and $\Sigma_i$ denote respectively the weight, mean vector and covariance matrix of Gaussian i. Let $p_i$ be the component i of the GMM so that $p(x)=\Sigma_{i=1}^{N}w_i p_i(x)$. Finally, let $\gamma_i(x_t)$ be the probability that the low level descriptor $x_t$ is assigned to Gaussian i. This quantity can be computed using the Bayes formula:

$$\gamma_i(x_t) = \frac{w_i p_i(x_t)}{\sum_{j=1}^{N} w_j p_j(x_t)} \qquad (1)$$

In the bag-of-words representation, the low-level descriptor $x_t$ is transformed into the high-level descriptor $f_t$ as follows:

$f_t=[\gamma_1(x_t),\gamma_2(x_t) \ldots \gamma_N(x_t)]$, which is an N-dimensional vector An alternative to the bag-of-words representation is a gradient representation (Fisher Kernel) as disclosed in Perronnin 2007. The gradient vector describes in which direction the parameters of the model should be modified to best fit the data. For example, let $\lambda$ denote the parameters of the generative model 36 and p its probability distribution function (pdf). Then in the gradient representation, the high-level feature descriptor $f_t$ is given by the vector $f_t=\nabla_\lambda \log p(x|\lambda)$.

Following the method outlined in Perronnin 2007, it is satisfactory to consider only the gradient with respect to the mean and standard deviation as it has been shown that the gradient with respect to the mixture weights does not contain significant information. In the following, the superscript d denotes the dth dimension of a vector. The following formulas can be written for the partial derivatives:

$$\frac{\partial \log p(x_1 | \lambda)}{\partial \mu_i^d} = \gamma_i(x_t) \left[ \frac{x_i^d - \mu_i^d}{(\sigma_i^d)^2} \right], \qquad (2)$$

$$\frac{\partial \log p(x_1 | \lambda)}{\partial \sigma_i^d} = \gamma_i(x_t) \left[ \frac{(x_i^d - \mu_i^d)^2}{(\sigma_i^d)^3} - \frac{1}{\sigma_i^d} \right].$$

The gradient vector is just the concatenation of these partial derivatives. These vectors are subsequently whitened using the normalization technique described in Perronnin 2007.

While both the bag-of-words and gradient representations are very high dimensional, they are also very sparse as only a very small number of components i (typically <5) have a non-negligible value $\lambda_i(x_t)$ for a given t. This makes the storage and processing of these high-level patch representations manageable.

The patch level BOV or gradient representations can be used by the global visual categorizer to describe the whole image by simply averaging or summing of these patch representations (See S122).

Patch Scoring (S110)

The high-level descriptors obtained at S108 are subsequently scored according to their class relevance. As noted above, it is assumed that there is a binary classifier for each object class. Any binary classifier may be used, such as Sparse Logistic Regression (SLR). See, for example B. Krishnapuram, L. Carin, M. Figueiredo, and A. Hartemink. Sparse multinomial logistic regression: Fast algorithms and generalization bounds. *IEEE PAMI*, 27(6)957.968 (2005). This provides for each patch and each class a score in the form of a class probability.

The relevance of $f_t$ with respect to class c is:

$$p(c \mid f_t) = \frac{1}{1 + \exp(-(w_c f_t + b_c))}, \quad (4)$$

where $w_c$ (a transposed vector) and $b_c$ are respectively, the learned separating hyperplane and offset for class c.

One of the advantages of SLR is that $w_c$ is typically very sparse which means that SLR performs simultaneous classification and feature selection. This speeds-up the computation of $p(c|f_t)$. Note that, instead of learning each patch classifier independently, they could have been learned jointly using, for example, Sparse Multinomial Logistic Regression (SMLR). See, for example B. Krishnapuram and A. J. Hartemink, Sparse multinomial logistic regression: Fast algorithms and generalization bounds, *PAMI*, 27(6), 2005.

Classifier Training

The classifier training stage is a precursor to the exemplary method, i.e., is generally performed prior to the method illustrated in FIG. 3.

A training set of images is provided which have been manually classified according to object category. In one embodiment, the location(s) of the object(s) in each of the training set images are provided. The location may be described by a bounding box, a more complex polygon, or a pixel mask. For example, an operator manually clicks on objects in a displayed image and roughly circumscribes them. The operator assigns each identified object to one of the object classes. The training system software may determine edges of the object which were only roughly identified by the operator or may simply draw a bounding box around it. A pixel mask can then be generated for a given object class in which all pixels in the image identified as being in the class are designated ON and all remaining pixels are designated as OFF (or vice versa). In the following, the generic term "mask" is used.

For each image and each class, there is an object mask (which can be empty if all pixels are OFF) which will be referred to as positive mask. Its complementary will be referred to as negative mask. If several instances of an object are present in the image, the mask refers to their union. The discriminative linear classifier can be learned at different levels:

1. Patch level: for this method, negative samples may be taken from the same images as the positive samples. As described for the method above, patches are extracted from the training images. Then for the positive samples, the high-level descriptors (e.g. gradient vectors) corresponding to the patches that are within (or significantly overlapping with) the positive masks of the class to be trained are used. Similarly, for the negative samples, the high-level descriptors corresponding to the patches that are within (or significantly overlapping with) the negative masks of this class are used (or alternatively, which are outside the positive mask). As the number of training samples can be very large (several millions), a sub-sample of the whole training set can be used. Online learning algorithms could also be employed.

2. Mask level: In this method, as training samples, the averages of the high-level descriptors over the masks are used. One advantage of this approach over the patch level approach is the smaller number of training samples and thus the reduced computational cost at training time. The downside is the possibility for a decrease in classifier accuracy.

3. Image level: in this method, as training samples, the averages of the high-level vectors over the entire images are used. This means that there are as many positive samples as positive images and negative samples as negative images for the considered class. This approach may be used, for example, when the data is only weakly labeled. In a weakly labeled data set, one only knows whether a class is present or not in an image. There is no information about the location of the class.

Pixel Scoring (S112)

In this step, patch scores are propagated to the pixels located within those patches. Since each pixel may be present in several patches, the resulting pixel score may be a function of the scores of each of the patches in which it resides. Thus, the class posteriors at the pixel level can be computed as a weighted average of the patch posteriors $p(c|f_t)$.

In computing the pixel score, the patch scores may be weighted to reflect the location of the pixel in the patch and the size of the patch. Thus, where a pixel is far from the center of the patch, the corresponding patch score is weighted less heavily than if it were closer to the center. In the case of patch size, a pixel which is a distance x from the center of a large patch is more heavily weighted than a pixel which is the same distance x from the center of a smaller patch.

For example, assume that there are T patches $\{\pi_t, t=1 \ldots T\}$ and that for each class c, there is a relevance probability $p_t(c)$. Then the score $p_z(c)$ of a given pixel z for class c may be determined as:

$$p_z(c) = \frac{\sum_{t=1}^{T} p_t(c) w_{t,z}}{\sum_{t=1}^{T} w_{t,z}}$$

where the weights $w_{t,z}$ are given by the Gaussian Kernel $N(z|\mu_t, \Sigma_t)$, $\mu_t$ is the geometrical center of patch $\pi_t$ and $\Sigma_t$ is a 2×2 isotropic covariance matrix with values $(\alpha\sigma_t)^2$ on the diagonal of the patch, where $\sigma_t$ is the size of patch $\pi_t$.

α is a parameter (constant) which can be selected empirically.

In the exemplary embodiment, a value of α=0.6 was found to be effective. Although the isotropic covariance assumption corresponds to round or square patches, elliptical or rectangular patches can be accommodated relatively easily by considering non-isotropic covariances.

Pixel Labeling

At S114, For each pixel, z the method includes computing the most likely class label $c^*=\arg\max_c p_z(c)$. If the corresponding probability value exceeds a given threshold θ, then the corresponding class label $c^*$ is associated to pixel z. Otherwise, no label (or an "other" label) is associated to pixel z. An alternative, region-based class labeling of pixels is described below.

Feature Combination

In the case where several low level features are extracted, e.g. SIFT and color in the exemplary embodiment, then at S114, for a given image, this gives one probability map per class per feature type. The probability maps can be merged for a given class through a weighted combination of the two (or more) probability maps.

Fast Context-Based Rejection (S122)

In the exemplary method, a global classification step (S122) is optionally performed prior to the patch scoring step (S110) described above. This serves as a fast rejection step for eliminating (or weighting less favorably) those classes which are not likely to be found in the image 16, or for which the objects in that class are too small to be useful. Additionally, it allows context to be factored in to the scoring. Thus, for example, an object in the "car" class is less likely to be found in an image which is globally categorized as "beach" than it is to be found in an image globally categorized as "urban" or "buildings." Using the context of the object for categorization generally improves the performance.

The training of the global classifiers 60 can be performed with weakly labeled data, i.e., images in which objects have not been localized and individually classified. Rather, the entire image has been assigned a class or classes. The weakly labeled data are used to train a set of global classifiers—one per class—at the image level.

The global classifiers may be similar to the classifiers used at the patch level (e.g., both patch and image classifiers may be based on the gradient representation). Thus for an input image, for each class, a probability (class posterior probability) is obtained for the presence of a class in the image. If the score of a class for the image is above a given threshold, then the patch score (S110) and probability maps (S112) for that class are thereafter computed and the corresponding probability map is used for the pixel or region labeling (S114). If the score of a class is below the threshold, then no probability map is computed for that class at S112 and the class is not taken into account for the labeling.

The global classification step has been found to improve the quality of the results by reducing the number of false positive pixels/regions in the obtained segmentation. One reason for this is that some patches can have high probabilities for incorrect classes, especially in relatively uniform areas. When the probability maps are combined, the high probability can exceed those of other classes and be assigned to the pixels. These false positives can be eliminated if that class has previously been rejected by the global classifier.

Providing a global classification step can also reduce the computation cost, since fewer probability maps have to be computed for each image. The threshold for the global classifier may be set as a compromise between precision and recall. While low thresholds will keep more maps and allow detecting small objects at the cost of higher false positive rates, a high probability threshold leads to more precision but less objects found. In the exemplary method, a threshold 0.5 was found to provide a good compromise. In another embodiment, the threshold for the global classifier may be set such that probability maps for only about 3 classes, or less, on average are computed per image.

The fast rejection can also be used to improve the quality of the patch classifier. As the only images which pass the global rejection test are those which are likely to contain the object, the patch classifier can be trained to segment specifically an object from its usual background/context. When training the classifier at the patch level, for the negative samples, only those patches which significantly overlap with negative masks located in images which have a high posterior probability are used (most of which should be images containing the considered object class). When training the classifier at the mask level, for the negative samples, only the negative masks which are in images which have a high posterior probability are used.

One potential drawback of this fast rejection mechanism is that if an object appears in an unusual context (e.g. a cow in an urban setting), the global classifier may prevent the discovery of such an object in the segmentation stage.

Low Level Segmentation and Region Labeling

Optionally, a low level segmentation step (S124) is performed prior to the labeling step (S114). In this embodiment, pixels in a region are all labeled with the same label at S114.

In the low level segmentation, the image is first segmented into a set of fairly homogeneous regions (e.g., with respect to color). For example, the image may be segmented into from about 30 to about 1000 of these regions.

In the labeling step (S114), class probabilities are averaged over each region. Finally the region as a whole is labeled with the most likely class label. As was the case for the pixel labeling, a rejection threshold θ is included and no label is assigned to regions with low probabilities or the region is labeled with an "other" class.

For the low-level segmentation, mean shift may be used. (See, for example, D. Comaniciu, P. Meer: Mean shift: A robust approach toward feature space analysis, *IEEE Trans. Pattern Anal. Machine Intell.*, 24, 603-619, 2002. Alternatively, other algorithms, such as normalized cuts, could be employed. See Jianbo Shi and Jitendra Malik, Normalized Cuts and Image Segmentation, PAMI Vol. 22, No. 8, 2000.)

The parameters of the low-level segmentation may be chosen so that over-segmentation of the objects is favored. The reason for favoring over-segmentation is that it is better to have an object split into two or more regions than to risk having two objects ending up in the same region. Connected regions with similar labels can be subsequently merged.

One advantage of this low level segmentation is that it tends to avoid obtaining object segments which have very smooth boundaries, as is demonstrated in FIGS. 4 and 5 and described in greater detail below. Without low level segmentation, boundaries tend to be artificially smoothed.

Segmenting the Image (S116)

The image 16 may be segmented into objects (segments) comprising contiguous regions of pixels that have all been labeled with the same class. Segments which are below a threshold size may optionally be ignored/merged into an adjacent segment or other smoothing operations may be performed. Each segment may be spaced from any other segments labeled with the same class by at least one segment labeled with another class (or labeled with an "other" class). In generating segments, the entire image is assigned to one or more classes. In some instances, the entire image may be a segment if all pixels are labeled with the same class. Where an image is segmented into two or more segments, each segment is in contact, at its border(s), with the border(s) of at least one other segment. It is also contemplated that in some cases, one segment may be totally surrounded by another segment.

Further Applications

Once a labeled map 70 identifying objects (segments labeled with class labels) has been generated, it can be used for a variety of applications. For example, images 16 and their corresponding maps 70 may be stored in a database, indexed according to the classes they contain. When a query 92 is input requesting images that includes objects in a particular class, a thumbnail of the each of the images containing object segments labeled with that class can be displayed, the thumbnails being created by automated cropping of the image using the segment labeled with the class as a basis for selecting the area to crop. Further details on automated thumbnail techniques are to be found in above-mentioned U.S. application Ser. No. 12/033,434.

Other applications are contemplated. For example, an automated crop may be desired for importing into a direct mailing document. Once again, a selected class can be input, and the crop automatically generated, based on the segment(s) of the image that are labeled with the selected class, and automatically imported into the document.

Insets can also be created using automated crop of a segment labeled with a selected class. An inset is generally an enlarged portion of an image which is superimposed on an area of low interest the same image. Further details on the creation of insets are to be found in above-mentioned U.S. application Ser. No. 12/123,511.

The method can also be incorporated into an automated image enhancement process or image rendering process, allowing segments labeled with different classes to receive different types of image enhancement, as described in above-mentioned Ser. No. 61/056,189, or a selecting different color profile for rendering. Categorizing an image region allows adjusting the parameters of an enhancement decision mechanism or the profile selection mechanism on the basis of the detected category (class).

Without intending to limit the scope of the exemplary embodiment, the following examples demonstrate the effectiveness of the method.

EXAMPLES

For the following examples, a system 10 as described above extracts patches on grids at multiple scales and use SIFT-like features, as disclosed in Lowe (D. Lowe, 'Distinctive image features from scale-invariant key-points,' *IJCV* 60(2):91-110 (2004), as well as simple color features. The dimensionality of these features is subsequently reduced to 50. For the high-level patch representations, a visual vocabulary of 1,024 Gaussians was used in the case of BOV and 64 Gaussians for gradient vectors (based on Fisher kernels) were used. For the low-level segmentation (mean-shift), the Edge detection and Image Segmentation (EDISON) System were used. (see http://www.caip.rutgers.edu/riul/research/code/EDISON/index.html (2003). The 5 dimensional pixel representations contain the Lab information and the pixel coordinates. For the image-level rejection mechanism, the Fisher representation and the SLR classifier were used.

A data set of images was used for training both global classifiers and patch classifiers. Gradient vectors were used for the low level descriptors. There were 21 object classes used. These were buildings, grass, tree, cow, sheep, sky, airplane, water, face, car, bicycle, flower, sign, bird, book, chair, road, cat, dog, body, and boat. A threshold of 0.5 on a scale of 0-1 was used. If no class was above this threshold for a patch, the patch was assigned to an 'other' class.

To compare the results, a scoring system based on the so-called union measure was used:

$$\frac{\text{Estimated Class Regions} \cap \text{Ground Truth Class Regions}}{\text{Estimated Class Regions} \cup \text{Ground Truth Class Regions}}$$

This measure incorporates the effect of false positives. For identifying the ground truth segments, manually labeled data was used. Several existing segmentation techniques were also scored. Table 1 shows the results of the proposed algorithm using the above scoring method, with and without optional steps of low level segmentation and global classification. In most cases, results were obtained when the patch classifier is learned (i) at the image level, (ii) at the mask level and (iii) at the patch level. Method 1 is the basic method—no global classification or low level segmentation. Method 2 uses low level segmentation but no global classification. Region labeling is thus performed. Method 3 uses both low level segmentation and global classification, again with region labeling. Method 4 uses context-based patch classification with both global classification and low level segmentation.

In method 4, as the global categorizer learns to distinguish between images containing the object from images which do not contain the object, the patch classifier can be trained to focus on the difference between the objects to be segmented and their usual background/context. Thus, working at the patch level, instead of considering as negative samples all the patches which do not overlap significantly with the object masks, the method considers only those patches which do not overlap significantly and which are in images with a high global score (most of which should be images of the considered object). A similar approach can be used if the patch classifier is trained at the mask level.

TABLE 1

Results of the proposed algorithm

| Method | Image Level | Mask Level | Patch Level |
|---|---|---|---|
| 1. Baseline-pixel labeling (no low level segmentation or global classification) | 7.3 | 14.5 | 13.7 |
| 2. Low level segmentation with region labeling | 9.2 | 15.9 | 15.0 |
| 3. Global classification and Low level segmentation with region labeling | 12.1 | 18.6 | 20.5 |
| 4. Global classification and Low level segmentation with region labeling, with context training of patch classifier | | | 25.8 |

Apart from the baseline method using image labeling, all methods compared favorably with the best existing technique, which gave a score of 8.6. it should be noted that a particularly challenging database was selected for these tests and that higher scores are to be expected in practical situations.

Although it has not been investigated in detail, some of the reasons for the improvement in results over conventional methods may be attributed to:

a) high-level representations at the patch-level, b) fast rejection of class hypotheses with a global classifier, c) class versus class-context training of the patch classifiers to better discriminate an object from its typical background.

Examples of Segmented Images

FIG. 4 shows segmentation examples using the methods disclosed herein using patch level classifier training with a global rejection step. FIG. 4A shows the original image (which for the test was in color not black and white, as shown). FIG. 4B illustrates a ground truth segmentation (how a human operator would have segmented the color image given a set of classes which included the classes "sky", "building" "road", and "car". FIG. 4C shows the automated segmentation produced when pixel labeling was performed. FIG. 4D shows the automated segmentation produced when region labeling (using Mean shift for low-level segmentation). FIG. 5 shows similar maps for another input image segmented into segments given a set of classes which included the classes "sky", "water" and "rocks".

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An automated image processing method comprising: with a processor:
   extracting a plurality of patches of an input image;
   for each patch, extracting at least one high level feature based on its low level representation and a generative model built from low level features;
   for each patch, and for at least one object class from a set of object classes, computing a relevance score for the patch based on the at least one high level feature and the output of at least one patch classifier;
   for at least some of the pixels of the image, computing a relevance score for the at least one object class based on the patch scores; and
   assigning an object class label to each of the pixels based on the computed relevance score for the at least one object class.

2. The method of claim 1, wherein the low level representation is based on low level features extracted from the patch.

3. The method of claim 1, further comprising:
   segmenting the image based on the pixels assigned classes.

4. The method of claim 1, wherein the assigning of one of the object classes to each pixel includes assigning one of the set of object classes, if a threshold relevance score is met.

5. The method of claim 1, wherein the at least one object class comprises a plurality of object classes.

6. The method of claim 1, further comprising classifying the image with a global classifier and, based on the global classification, identifying a subset of the set of object classes for which a relevance score for the patch, based on the at least one high level feature, is computed.

7. The method of claim 1, further comprising:
   partitioning the image into multiple regions, using low-level segmentation;
   for each region and each class, combining the computed pixel relevance scores; and
   wherein the assigned class is based on the combined pixel relevance scores.

8. The method of claim 1, wherein at least 20 patches are extracted.

9. The method of claim 1, wherein at least some of the pixels are present in more than one patch and the computed relevance score for the at least one object class based on the patch scores is an optionally weighted function of the patch scores for the patches in which the pixel is present.

10. The method of claim 1, wherein the relevance score for the at least one object class based on the patch scores is computed for all the pixels of the image.

11. The method of claim 1, wherein the patch classifier comprises a set of binary classifiers, each trained on positive and negative samples of the class.

12. The method of claim 11, wherein negative samples are extracted from images that each contain a positive sample.

13. The method of claim 11, wherein the positive samples are patches manually assigned to the respective class.

14. The method of claim 1, wherein the generative model is a Gaussian mixture model trained on low level features extracted from training images.

15. An automated image processing system comprising memory which stores instructions for performing the method of claim 1 and a processor, in communication with the memory, which executes the instructions.

16. An image segmented by the method of claim 1.

17. A computer program product comprising a non-transitory recording medium that stores instructions which, when executed by a computer, perform an image processing method comprising:
   extracting a plurality of patches of an input image;
   for each patch, extracting at least one high level feature based on its low level representation and a generative model built from low level features;
   for each patch, and for at least one object class from a set of object classes, computing a relevance score for the patch based on the at least one high level feature and the output of at least one patch classifier;
   for at least some of the pixels of the image, computing a relevance score for the at least one object class based on the patch scores; and
   assigning an object class label to pixels of the image, based on the computed relevance score for the at least one object class.

18. An automated image processing system comprising:
   a patch extractor which extracts patches of an input image;
   a low level feature extractor which extracts, for each patch, a low level feature;
   a high level feature extractor which extracts, for each patch, a high level feature based on the low level feature and a generative model built on low level features;
   a classifier system, configured for classifying the patch, based on the high level feature, for each of a set of object classes;
   a scoring component which for each patch, and for at least one object class from a set of object classes, computes a relevance score for the patch based on the classifier and, for at least some of the pixels of the image, computes a relevance score for the at least one object class based on the patch scores; and
   a labeling component assigns an object class to each of the pixels based on the computed relevance score for the at least one object class.

19. A digital image processing method comprising: with a processor:
   for an input image, extracting patches in the image;
   from each patch, extracting a low-level representation comprising a feature vector;
   for each patch, using its low-level representation and a generative model to extract a high-level representation;

for each patch and each class, computing a relevance score based on the high-level representation and a patch classifier;

for each pixel and each class, computing a relevance score based on the patch scores; and for each pixel, take a decision based on the class scores.

20. The method of claim 19, wherein the method further comprises:

partitioning the image into regions using low-level segmentation; and or each region and each class, combining the pixel scores; and for each region, take a decision based on the class scores, the decision for each pixel being based on the region decision.

21. The method of claim 19, wherein the image is assigned a global score with respect to each class and a class is considered only if the global score of the considered class exceeds a given threshold.

* * * * *